United States Patent
Natori et al.

(10) Patent No.: US 10,269,137 B2
(45) Date of Patent: *Apr. 23, 2019

(54) DISPLAY DEVICE, DISPLAY CONTROL METHOD, AND DISPLAY SYSTEM

(71) Applicant: Seiko Epson Corporation, Tokyo (JP)

(72) Inventors: Takashi Natori, Suwa (JP); Kyosuke Itahana, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,023

(22) Filed: Mar. 12, 2018

(65) Prior Publication Data
US 2018/0204348 A1 Jul. 19, 2018

Related U.S. Application Data

(63) Continuation of application No. 14/880,609, filed on Oct. 12, 2015, now Pat. No. 9,953,434.

(30) Foreign Application Priority Data

Nov. 7, 2014 (JP) ................................ 2014-227372

(51) Int. Cl.
*G06T 7/73* (2017.01)
*G06F 3/042* (2006.01)
*G06F 3/0354* (2013.01)

(52) U.S. Cl.
CPC .............. *G06T 7/73* (2017.01); *G06F 3/0425* (2013.01); *G06F 3/0354* (2013.01); *G06F 2203/04807* (2013.01)

(58) Field of Classification Search
None
See application file for complete search history.

(56) References Cited

U.S. PATENT DOCUMENTS

| 5,138,304 A | 8/1992 | Bronson |
| 2002/0042699 A1* | 4/2002 | Tanaka ................. G06F 3/0386 703/2 |

(Continued)

FOREIGN PATENT DOCUMENTS

| JP | 2003-248551 A | 9/2003 |
| JP | 2011-143557 A | 7/2011 |

(Continued)

OTHER PUBLICATIONS

Non-Final Office Action received in U.S. Appl. No. 14/880,609, dated Sep. 30, 2016.

(Continued)

*Primary Examiner* — Ryan P Potts
(74) *Attorney, Agent, or Firm* — ALG Intellectual Property, LLC

(57) ABSTRACT

A display device includes: an input unit which has image data inputted from an image supply device; a detection unit which detects a position of an indicator and generates indicator information including information about the detected position; a setting unit which sets a mode for processing the indicator information to a first mode or a second mode; a drawing unit which draws a second image generated on the basis of the indicator information and superimposes the second image on a first image generated on the basis of the inputted image data; a selection unit which outputs the indicator information to the drawing unit if the first mode is set and outputs the indicator information to the image supply device if the second mode is set; and a drawing control unit which erases the second image if a switching from the first mode to the second mode is carried out.

16 Claims, 8 Drawing Sheets

(56) References Cited

U.S. PATENT DOCUMENTS

| | | |
|---|---|---|
| 2004/0085522 A1 | 5/2004 | Honig |
| 2006/0077188 A1* | 4/2006 | Byun .................... G06F 3/0425 345/179 |
| 2006/0082733 A1 | 4/2006 | Saito |
| 2006/0267966 A1 | 11/2006 | Grossman |
| 2007/0198948 A1* | 8/2007 | Toriyama .............. A63F 13/005 715/790 |
| 2008/0222233 A1 | 9/2008 | Shi |
| 2009/0021480 A1* | 1/2009 | Tagawa ................. G06F 3/0386 345/158 |
| 2011/0169756 A1 | 7/2011 | Ogawa et al. |
| 2012/0280948 A1 | 11/2012 | Barrus |
| 2013/0055143 A1 | 2/2013 | Martin |
| 2013/0069870 A1 | 3/2013 | Ichieda |
| 2013/0106908 A1 | 5/2013 | Ichieda |
| 2013/0229333 A1 | 9/2013 | Schwartz |
| 2013/0300658 A1* | 11/2013 | Endo ..................... G06F 3/0425 345/157 |
| 2013/0314439 A1 | 11/2013 | Ota et al. |
| 2013/0328837 A1* | 12/2013 | Arizumi ................ G06F 1/1639 345/179 |
| 2013/0342458 A1* | 12/2013 | Williams ............... G09B 5/067 345/158 |
| 2015/0278983 A1* | 10/2015 | Uefuji .................... G09G 5/003 345/173 |
| 2015/0339050 A1 | 11/2015 | Vong |

FOREIGN PATENT DOCUMENTS

| | | |
|---|---|---|
| JP | 2011-253306 A | 12/2011 |
| JP | 2013-097177 A | 5/2013 |
| JP | 2013-246285 | 12/2013 |

OTHER PUBLICATIONS

Non-Final Office Action received in U.S. Appl. No. 14/880,609, dated May 4, 2017.

Final Office Action received in U.S. Appl. No. 14/880,609, dated Sep. 6, 2017.

Notice of Allowance and Notice of Allowability received in U.S. Appl. No. 14/880,609, dated Dec. 28, 2017.

* cited by examiner

DISPLAY DEVICE, DISPLAY CONTROL METHOD, AND DISPLAY SYSTEM

The present application is a continuation application of U.S. patent application Ser. No. 14/880,609 filed Oct. 12, 2015, which claims priority from Japanese Patent Application No. 2014-227372, filed Nov. 7, 2014, each of which are expressly incorporated by reference herein.

BACKGROUND

1. Technical Field

The present invention relates to a display device, a display control method, and a display system.

2. Related Art

There is a display device having the function of inputting various instructions using indicator such as an electronic pen or finger to a display area (see JP-A-2011-253306). With this function, various operations on an application such as scrolling up and down an application window, as well as drawing an image object on top of a background image (so-called annotation), can be carried out from a place which is distant from a computer controlling the display device. For example, in the state where a document preparation application or an application for displaying a presentation image is being executed, an annotation is drawn on top of a displayed image (background image), using an electronic pen. Thus, the viewer's attention is drawn to specific parts.

Here, if the content of the background image is changed, the annotation drawn thereon often needs to be erased. Generally, an annotation makes sense when a specific background image is situated at a specific position. Therefore, if this relationship is changed, the existence of the annotation no longer makes sense.

According to the related art, when the content of the background image is changed by scrolling up or down the window or by switching the application to another, generally, the user needs to carry out an operation for deleting the displayed annotation, using an indicator. It is troublesome to carry out this operation every time the background image is updated. In view of this, there is a technique that provides an application with the function of forcibly erasing the annotation drawn, when displaying a new page.

However, according to the related art, the automatic deletion of the annotation functions only in response to a specific operation in an application (specifically, change or update of an entire display image due to page switching) and does not function in the case where the display content is partly changed by scrolling up or down the window, or the like. Moreover, according to the related art, the automatic deletion does not function in the case where the content of the background image is changed with the annotation disabled as a result of carrying out an operation extending across a plurality of applications (switching the active application or the like).

SUMMARY

An advantage of some aspects of the invention is that the operation of erasing an image displayed as a combined image is assisted.

An aspect of the invention provides a display device including: an input unit to which image data is inputted from an image supply device; a detection unit which detects a position of an indicator and generates indicator information including information about the detected position; a setting unit which sets a mode for processing of the indicator information to a first mode or a second mode; a drawing unit which draws a second image generated on the basis of the indicator information and superimpose the second image on a first image generated on the basis of the inputted image data; a selection unit which outputs the indicator information to the drawing unit if the first mode is set and which outputs the indicator information to the image supply device if the second mode is set; and a drawing control unit which erases the second image if a switching from the first mode to the second mode is carried out.

According to this display device, the operation of erasing an image displayed as a combined image is assisted.

The drawing control unit may execute the erasure of the second image if it is detected that the first image is updated, after the switching is carried out.

According to this display device, the erasure is executed after it is confirmed that there is a change to the first image.

The drawing control unit may execute the erasure of the second image if a predetermined period passes without having the first image updated, after the switching is carried out.

According to this display device, the second image is automatically erased in the case where a predetermined time passes without having the first image updated as well.

The display device may further include a storage unit which stores the second image. The drawing control unit may store the second image in the storage unit before executing the erasure of the second image.

According to this display device, the second image displayed once can be used for later reference.

Another aspect of the invention provides a display control method including: inputting image data from an image supply device; detecting a position of an indicator and generating indicator information including information about the detected position; setting a mode for processing of the indicator information to a first mode or a second mode; causing a drawing unit to draw a second image generated on the basis of the indicator information and superimpose the second image on a first image generated on the basis of the inputted image data; outputting the indicator information to the drawing unit if the first mode is set, and outputting the indicator information to the image supply device if the second mode is set; and erasing the second image if a switching from the first mode to the second mode is carried out.

According to this display control method, the operation of erasing an image displayed as a combined image is assisted.

Still another aspect of the invention provides a display system including: an image supply unit; an input unit to which image data is inputted from the image supply unit; a detection unit which detects a position of an indicator and generates indicator information including information about the detected position; a setting unit which sets a mode for processing of the indicator information to a first mode or a second mode; a drawing unit which draws a second image generated on the basis of the indicator information and superimpose the second image on a first image generated on the basis of the inputted image data; a selection unit which outputs the indicator information to the drawing unit if the first mode is set and which outputs the indicator information to the image supply unit if the second mode is set; and a drawing control unit which erases the second image if a switching from the first mode to the second mode is carried out.

According to this display system, the operation of erasing an image displayed as a combined image is assisted.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Example

Figure 1:
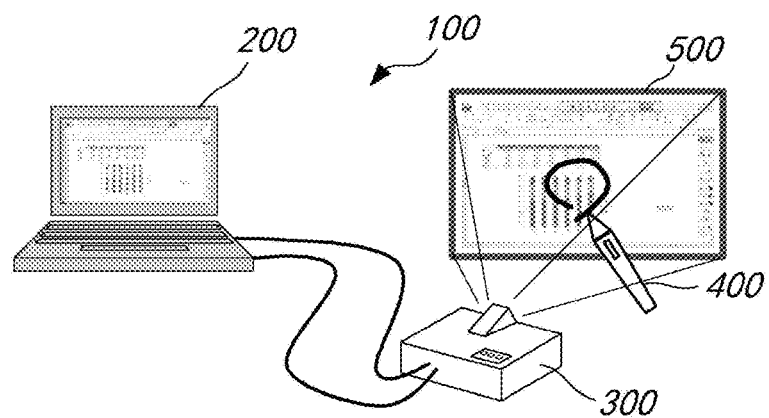
FIG. 1 shows the outline of a display system.

FIG. 1 shows the outline of a display system 100. The display system 100 includes a PC 200, a projector 300, an indicator 400, and a display surface 500. The PC 200 is an ordinary personal computer capable of executing a document preparation application, an image browser application and the like. The PC 200 supplies data of an image to be displayed on the display surface 500 (for example, the screen of an application being executed by the PC 200), to the projector 300 connected to the PC 200.

The projector 300 has functions as an ordinary projector and projects a video based on the image data supplied from the PC 200, on the display surface 500. The display surface 500 is a dedicated screen or wall surface.

The indicator 400 is an input device such as an electronic pen held by the user, or the user's own hand or finger. The user designates a position in the display surface 500, using the indicator 400, and thus can draw an image object on top of the image based on the image data supplied from the PC 200, on the display surface 500, or can cause the application program being operated by the PC 200 to realize an operation corresponding to this position. For example, when a document browser application is started up by the PC 200 and a window related to the application is displayed, drawing a line or graphic pattern (annotation) on top of the screen, scrolling up and down the window, starting up and switching other applications, and the like, may be carried out by operating the indicator 400.

Figure 2:
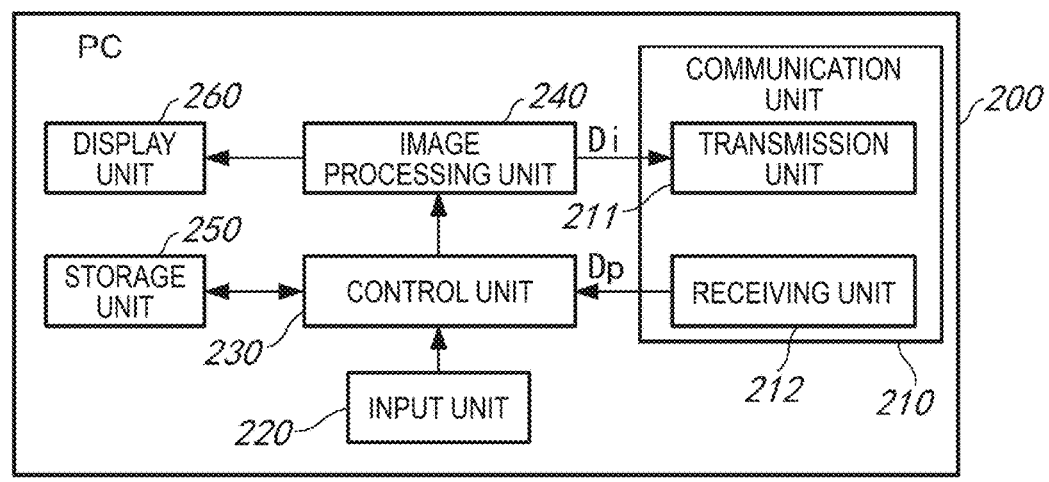
FIG. 2 shows the functions of a PC.

FIG. 2 shows the functions of the PC 200. The PC 200 includes a communication unit 210, an image processing unit 240, a control unit 230, a display unit 260, a storage unit 250, and an input unit 220.

The communication unit 210 is a communication interface and includes a transmission unit 211 and a receiving unit 212. The receiving unit 212 receives indicator information Dp from the projector 300 and supplies the indicator information Dp to the control unit 230. The transmission unit 211 transmits image information Di supplied from the image processing unit 240, to the projector 300.

The control unit 230 is realized by a processor such as a CPU and executes various application programs such as a document preparation application and image browser application. As the control unit 230 receives the indicator information Dp from the receiving unit 212, the control unit 230 transfers coordinate information included in the indicator information Dp to the application program. The control unit 230 specifies an operation (page switching, screen scrolling or the like) prescribed to the application program on the basis of the position coordinates. Then, if the specified operation involves update of the screen, the control unit 230 outputs a command to update the screen to the image processing unit 240.

The image processing unit 240 generates image information Di corresponding to the updated screen data on the basis of the command supplied from the control unit 230. The generated image information Di is supplied to the display unit 260 and the transmission unit 211.

The display unit 260 is a display device such as a liquid crystal display.

The input unit 220 is an input device such as a keyboard and mouse and inputs an instruction or command from the user to the control unit 230.

The storage unit 250 is a storage device such as a hard disk or semiconductor memory and stores an OS and application programs executed by the control unit 230.

Figure 3:
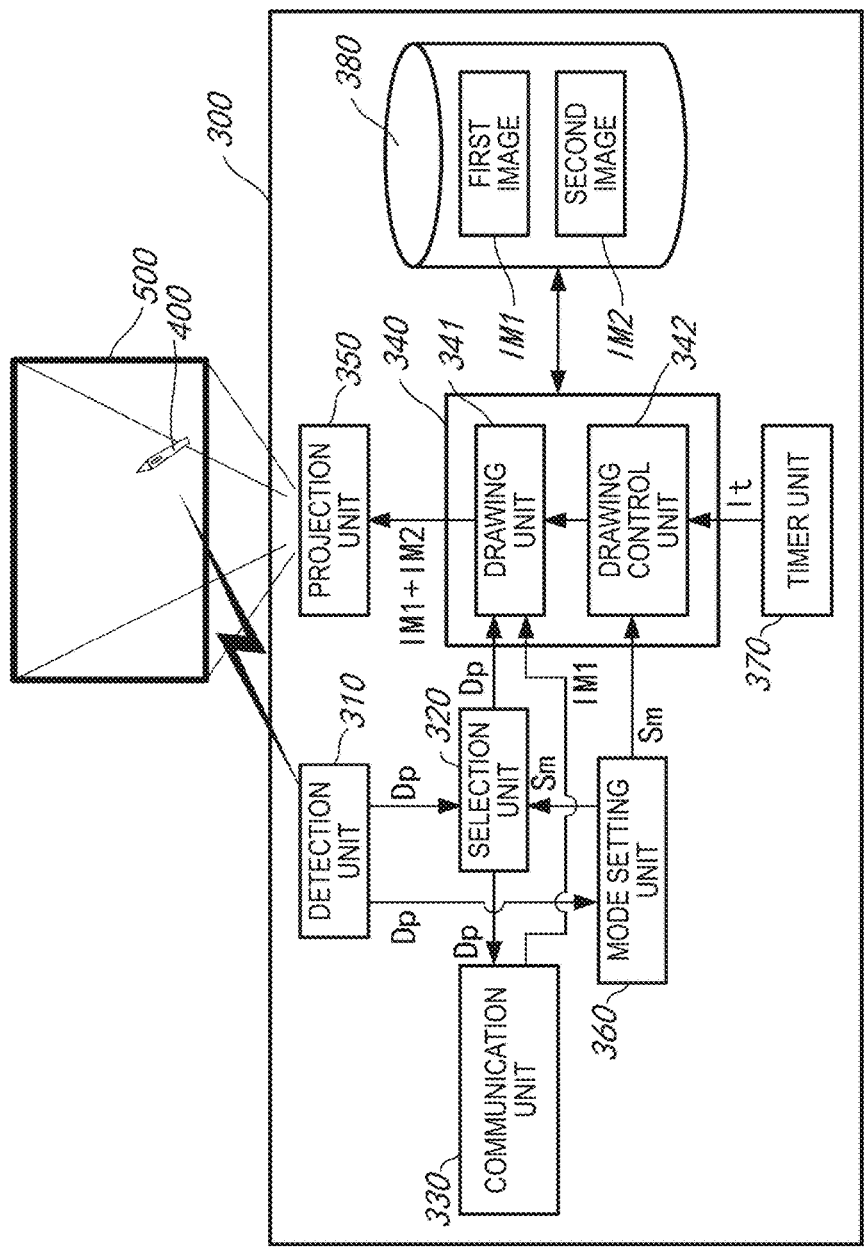
FIG. 3 shows the functions of a projector.

FIG. 3 shows the functions of the projector 300. The projector 300 is an ordinary projector and projects a video on the display surface 500 under the instruction of the PC 200.

The projector 300 includes a detection unit 310, a selection unit 320, a communication unit 330, an image processing unit 340, a projection unit 350, a mode setting unit 360, a timer unit 370, and a storage unit 380.

The detection unit 310 monitors the position of the indicator 400. When a position on the display surface 500 is designated by the indicator 400, the detection unit 310 generates indicator information Dp indicating the operation content of the indicator 400. The indicator information Dp includes the coordinates of this position. Specifically, the detection unit 310 has a light source and a light sensor. The detection unit 310 casts visible light or infrared rays toward the display surface 500 and receives and analyzes the reflected light, thus specifying the existence of the indicator 400 and the position thereof. Alternatively, if the indicator 400 is a device having a wireless transmission function, the detection unit 310 may receive radio waves from the indicator 400 and decide the position of the indicator 400 in the display surface 500 on the basis of the intensity of the received radio waves, or the like. The generated indicator information Dp is successively supplied to the selection unit 320.

The mode setting unit 360 designates one of a first mode (referred to as drawing mode) and a second mode (referred to as mouse mode) as the mode for processing the operation content of the indicator 400. The drawing mode is a mode in which the indicator 400 is made to function as an input device for drawing an annotation. The mouse mode is a mode in which the indicator 400 is used for other operations than drawing (operation related to a change to the image other than annotation) and in which the input content is transferred to the PC 200. The user can carry out this designation or change to the designation at a desired timing, using the indicator 400. Specifically, whether the indicator information Dp supplied from the detection unit 310 indicates the switching of the mode or not, and if the switching is indicated, a signal indicating the mode after the switching is outputted to the selection unit 320 and a drawing control unit 342.

The selection unit 320 outputs the indicator information Dp to only one of the communication unit 330 and a drawing unit 341 on the basis of mode information Sm supplied from the mode setting unit 360. The output destination to be selected is decided on the basis of the mode information Sm. Specifically, the indicator information Dp is outputted to the drawing unit 341 in the case of the drawing mode, and to the communication unit 330 in the case of the mouse mode. As a result, in the case where the drawing mode is selected, a graphic pattern such as a point is drawn at the position designated by the indicator 400. In the case of the mouse mode, drawing at the designated position is not carried out. Instead, the coordinates of this position are transferred to the application in charge of drawing a first image IM1 started by the PC 200 and an operation prescribed by the application at the transfer destination (for example, page switching, window scrolling or the like) is executed.

The communication unit 330 is a communication interface. The communication unit 330 transmits the indicator information Dp outputted from the selection unit 320, to the PC 200, and also supplies the first image IM1 received from the PC 200, to the drawing unit 341.

The image processing unit 340 includes the drawing unit 341 and the drawing control unit 342. The drawing unit 341 generates a second image IM2 based on the indicator information Dp and combines the first image IM1 supplied from the communication unit 330 with this generated second image IM2. In other words, the drawing unit 341 draws a second image IM2 based on the indicator information Dp and superimposes the second image on the first image IM1 supplied from the communication unit 330. A video signal expressing the combined image is outputted from the drawing unit 341 to the projection unit 350. Also, on the basis of a control signal Sd supplied from the drawing control unit 342, erasure of the second image IM2 or storage of the first image IM1 and the second image IM2 is carried out.

The drawing control unit 342 outputs the control signal Sd to the drawing unit 341. The control signal Sd includes a command related to execution of the erasure of the second image IM2 or a command related to the storage of the first image IM1 and the second image IM2. Specifically, the drawing control unit 342 monitors the mode information Sm supplied from the mode setting unit 360, and includes an erasure command for the second image IM2 in the control signal Sd if there is a switching between the mouse mode and the drawing mode. Moreover, the drawing control unit 342 may include an erasure command for the second image IM2 in the control signal Sd on the basis of time information It supplied from the timer unit 370. The storage of the first image IM1 and the second image IM2 is carried out separately. That is, instead of storing one data expressing the combined screen, the first image IM1 and the second image IM2 are saved in the storage unit 380 in such a way that the first image IM1 and the second image IM2 can be used separately from each other for later reference.

The projection unit 350 is realized by: a light source (laser or the like); a projection mechanism including a lens, mirror and prism; a modulation mechanism which includes optical elements such as liquid crystal panels corresponding to the respective colors and which modulates light from the light source on the basis of a video signal; and an optical system which guides the modulated light to the projection mechanism.

The timer unit 370 counts the time elapsed from an arbitrary time point and supplies the count value to the drawing control unit 342.

The storage unit 380 is a storage device such as a semiconductor memory or hard disk. In the storage unit 380, a program executed by the image processing unit 340 at the startup of the projector 300 so as to realize an operation for combined image display of the first image IM1 and the second image IM2, described later, is stored. Moreover, in the storage unit 380, the first image IM1 and the second image IM2 can be separately saved and reused later according to need.

Figure 4:
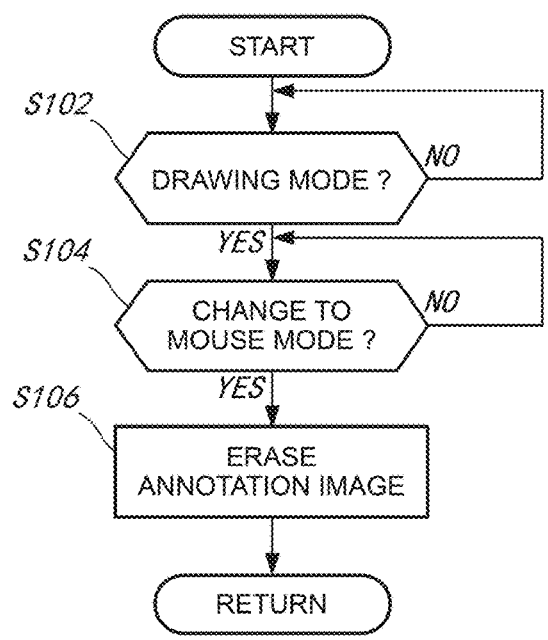
FIG. 4 shows an operation example (part 1) of the projector.

FIG. 4 shows an operation example (part 1) of the projector 300. If the drawing mode is selected (S102, YES) and it is detected that the mode is subsequently changed to the mouse mode (S104, YES), and if any second image IM2 is currently displayed, the image processing unit 340 erases all these second images IM2 (S106).

Figure 5:
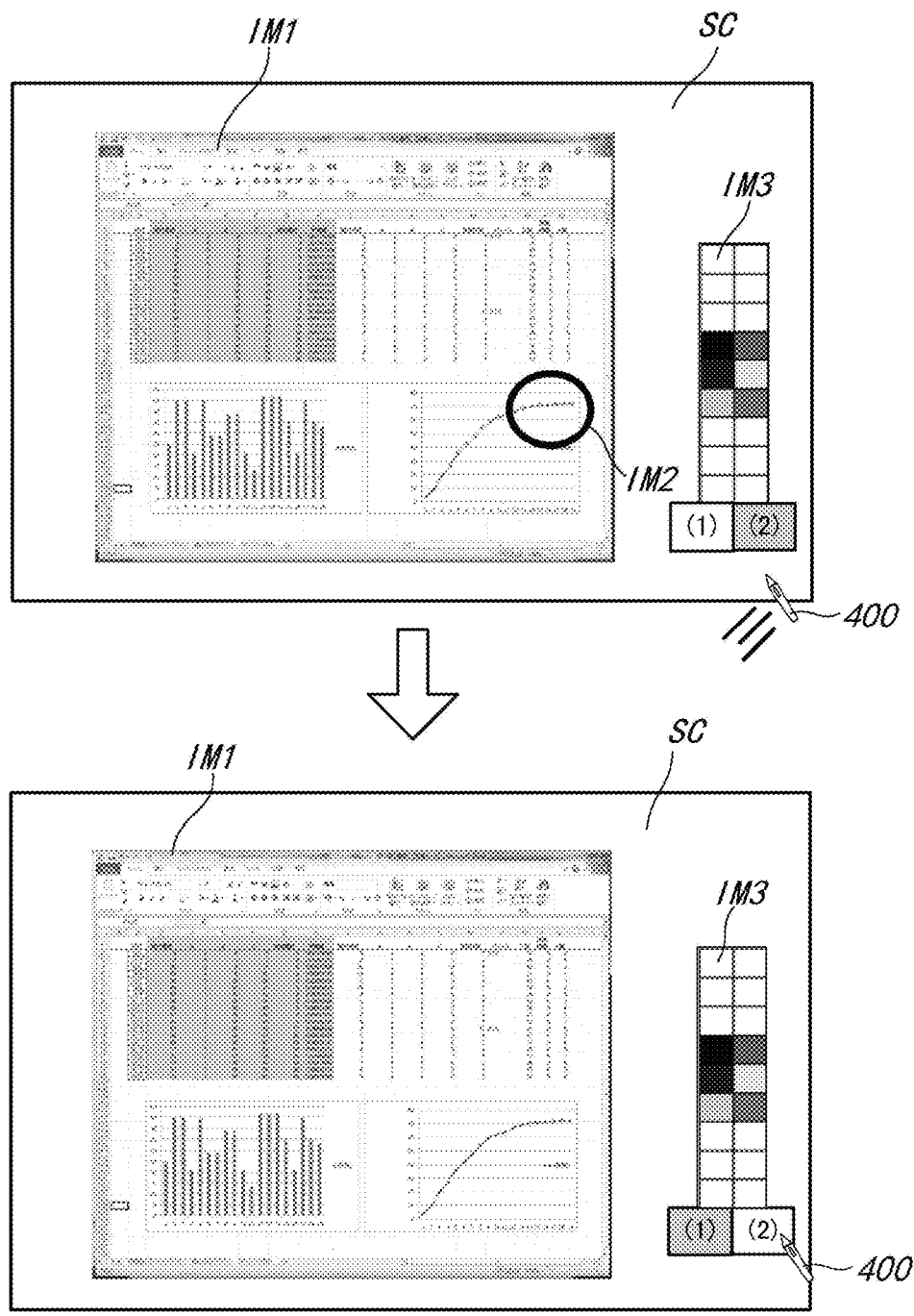
FIG. 5 shows an example of a screen.

FIG. 5 shows an example of a screen SC. The screen SC is displayed when a predetermined application is started up by the PC 200. The screen SC includes a first image IM1, a second image IM2, and an operation panel IM3. In this example, the first image IM1 is a spreadsheet software execution screen, where an image object (circle) drawn to mark a position desired by the user is displayed as a combined image.

The operation panel IM3 is an image object which is for designating an input function of the indicator 400 and is constantly displayed on the screen SC by the drawing unit 341 regardless of the contents of the first image IM1 and the second image IM2. Specifically, each position on the operation panel IM3 corresponds to each function, and the user designates a desired input function by designating a position on the operation panel IM3, using the indicator 400. More specifically, the operation panel IM3 has the function of designating an attribute or detail of drawing content (color, line type or the like of the pen). Moreover, the operation panel IM3 has the function of switching between the mouse mode (2) and the drawing mode (1) in response to a touch on a predetermined position. The operation panel IM3 also has the function of erasing and correcting the second image IM2 that is drawn already (eraser function).

As the user designates the drawing mode, draws the second image IM2 as illustrated at the top of FIG. 5, and subsequently touches "(2)" to switch to the mouse mode, the second image IM2 is automatically erased, as illustrated in the bottom of FIG. 5.

According to the related-art technique, if there is a second image IM2 that the user wants to erase, the user carries out a touch operation on the operation panel IM3 to enable the eraser function, using the indicator 400, and designates an erasure target (on an object basis, dot basis, area basis, or the like), using the indicator 400. For example, in the case where a plurality of second images IM2 is drawn, it takes time and effort to erase the second images IM2 on a dot basis.

In contrast, in the above example, all the displayed second images IM2 are automatically deleted, triggered by the switching between the operation modes, without the user's explicit operation to delete the second images IM2. Therefore, no unwanted annotation remains afterwards even if there is any change to the first image IM1. Thus, according to the example, the time and effort required from the user to erase the annotation can be saved. Particularly, in the case of giving a presentation using the projector 300, not only the time taken for the annotation deletion operation during the valuable presentation time can be reduced, but also the user can concentrate on the presentation itself.

The possibility that the time of this automatic deletion is against the user's intention is low. This is because switching the input mode is usually regarded as the case where a drawing operation is complete and an operation other than drawing is to be carried out from now (therefore, it is highly likely that the content of the first image IM1 changes). In other words, in the example, it can be said that the user's operation is predicted (presumed) and that erasure is executed without waiting for an explicit erasure operation to be carried out.

2. Other Examples

Figure 6:
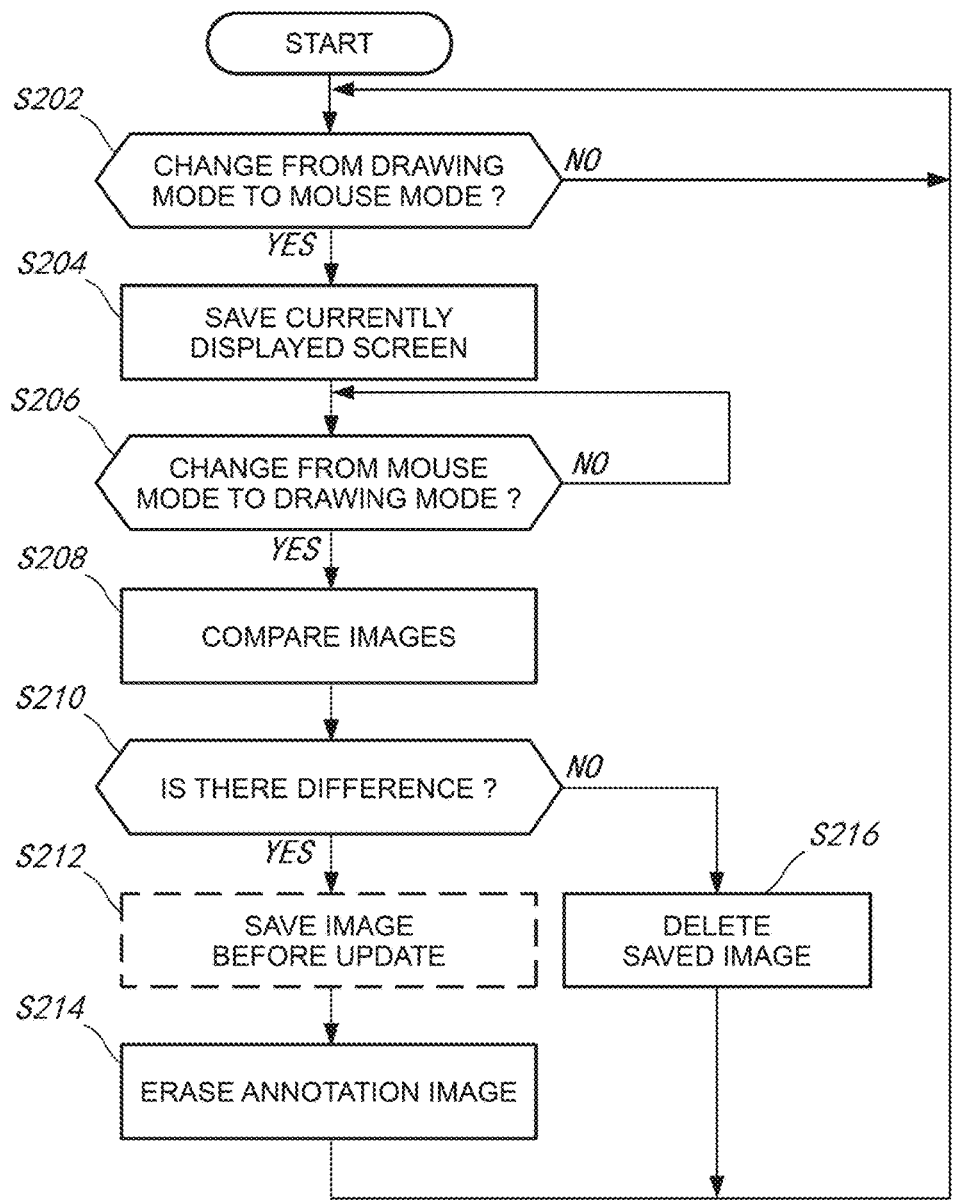
FIG. 6 shows an operation example (part 2) of the projector.

FIG. 6 shows an operation example (part 2) of the projector 300. If it is detected that a change from the drawing mode to the mouse mode is made (S202, YES), the currently displayed screen is saved, that is, the screen where the first image IM1 and the second image IM2 are combined is captured (S204). Subsequently, if it is detected a change from the mouse mode to the drawing mode is made (S206, YES), the image displayed at the time and the image saved in S204 are compared with each other (S208). That is, it is determined whether there is a change to the content of the first image IM1 in the state where the mouse mode is on, or not.

If there is a difference as a result of the comparison (that is, if there is a change to the content of the first image IM1) (S210, YES), the second image IM2 is erased (S214). In this case, before the deletion, the first image IM1 and the second image IM2 may be associated with each other and saved as separate image files (S212).

If there is no difference (that is, if there is no change to the content of the first image IM1) (S210, NO), the image saved in S204 is deleted (S216).

Figure 7:
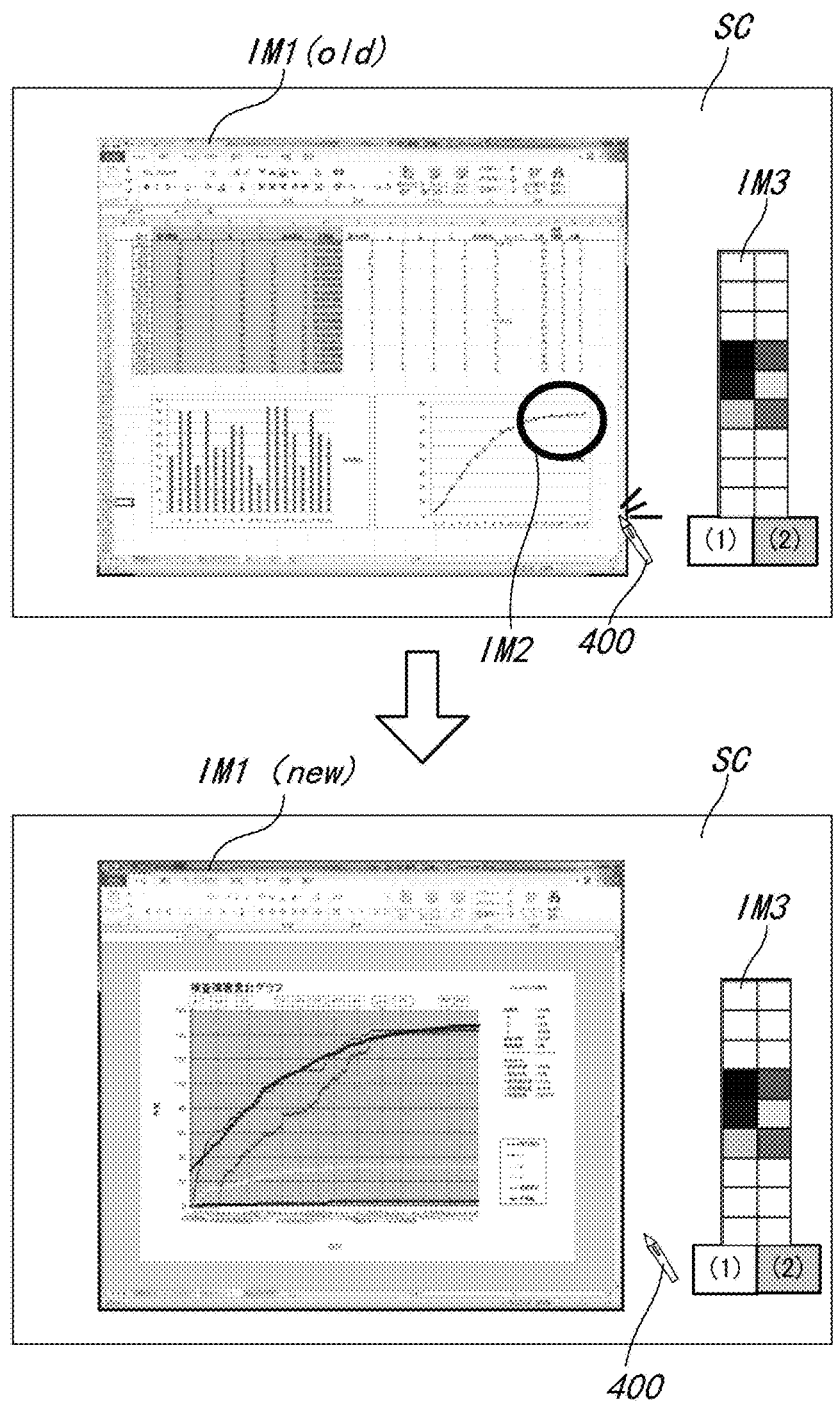
FIG. 7 shows an example of the screen.

FIG. 7 shows an example of the screen SC corresponding to the operation example of FIG. 6. In the drawing mode, a second image IM2 is drawn and the second image IM2 is displayed as a combined image with a first image IM1 (old) (at the top of FIG. 7). At the timing when a switching to the mouse mode is made in this state, the combined screen of the first image IM1 (old) and the second image IM2 is saved. Subsequently, at the timing when a switching to the drawing mode is made, screen comparison is carried out. At this time, the combined image {first image IM1 (old)+second image IM2} and a combined image {first image IM1 (new)+second image IM2} are compared with each other. Here, since there is no change to the content of the second image IM2 during the operation mode, this comparison equals determining a change to the screen of the first image IM1. If it is determined that the first image IM1 is changed, a screen where the second image IM2 is automatically erased is displayed, as illustrated at the bottom of FIG. 7.

In this operation example, even if a switching from the drawing mode to the mouse mode is made, automatic erasure is executed when it is confirmed that the first image IM1 is actually updated, instead of unconditionally erasing the displayed second image IM2. Therefore, the execution of erasure in the case where there is no necessity for erasing the second image IM2 is prevented, as in the case where an effective operation is not carried out even though the user switches from the drawing mode to the mouse mode, or where the operation carried out is not related to a change to the first image IM1.

Figure 8:
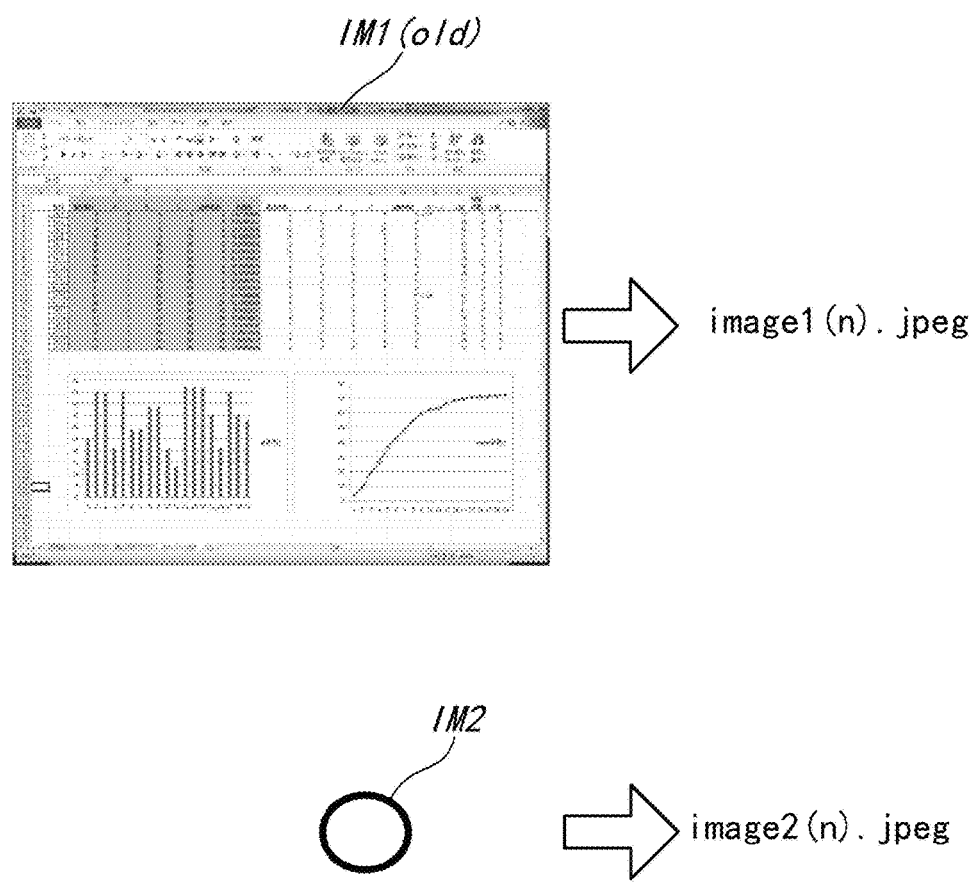
FIG. 8 shows an example of the screen.

FIG. 8 conceptually shows the saving of the first image IM1 and the second image IM2. As shown in FIG. 8, the first image IM1 and the second image IM2 are saved as separate image files. It is easy to edit the combined image later (such as changing the shape or position of the annotation itself).

Figure 9:
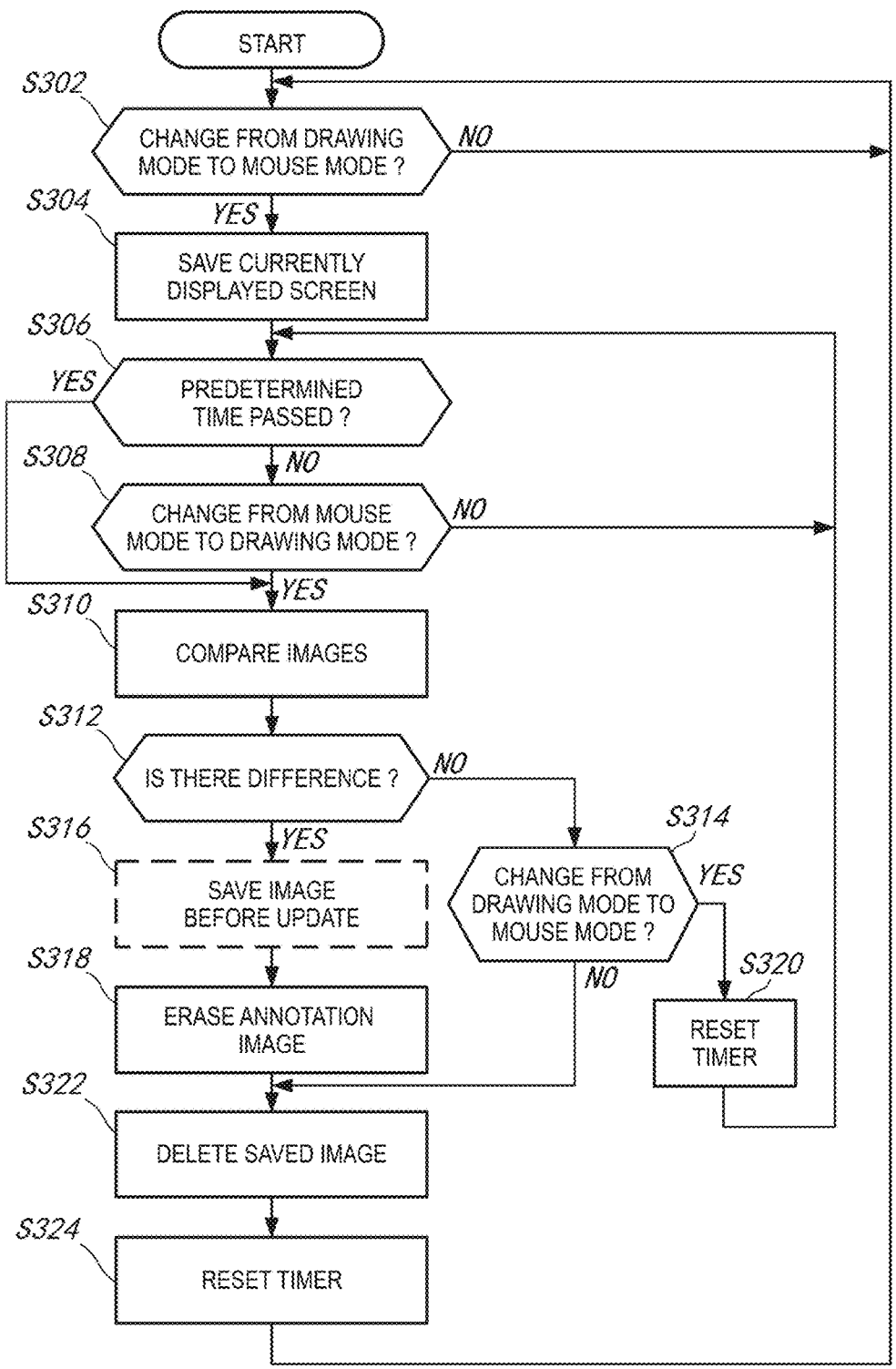
FIG. 9 shows an operation example (part 3) of the projector.

FIG. 9 shows an operation example (part 3) of the projector 300. A change from the drawing mode to the mouse mode is detected (S302, YES). The currently displayed screen is saved (S304). Also, measurement of the time elapsed from when the mode is changed to the mouse mode is started (S306). If the time elapsed does not reach a predetermined value (S306, NO), a change from the mouse mode to the drawing mode is monitored (S308), as in the operation of FIG. 6. If this change is detected (S308, YES), whether there is a change to the first image IM1 or not is checked (S310), as in S208 of FIG. 6. If a predetermined time has passed (S306, YES) even if a switching of the mode is not detected, a change to the first image IM1 is checked (S310).

If it is confirmed that the first image IM1 is changed (S312, YES) as a result of the check in S310, the second image IM2 is deleted (S318). Subsequently, the image saved for check is deleted (S322). After the timer is reset (S324), a switching to the mouse mode is monitored again (S302).

If the first image IM1 is not changed and the drawing mode is still on (S314, NO), the image saved for check is deleted (S322) without erasing the second image IM2. After the timer is reset (S324), a switching to the mouse mode is monitored (S302). If the first image IM1 is not updated and a switching from the drawing mode to the mouse mode is subsequently detected (S314, YES), the timer is reset (S320) and the flow returns to the processing to execute both the monitoring of the time elapsed (S306) and the monitoring of a switching to the drawing mode (S308).

In this way, in the case where a predetermined period has passed without having the first image IM1 updated after a switching to the mouse mode is made, when the mouse mode is ended, the first image IM1 is checked, thus enabling execution of the erasure of the second image IM2. The reason for this is that, if the mouse mode stays on for a long period, there is a high possibility that a certain operation is carried out and that consequently the first image IM1 is changed at the end of the mouse mode. Therefore, it is practical to execute the check of the first image IM1 at this timing.

Also, after the lapse of a predetermined time, the second image may be erased, omitting the determination on the end of the mouse mode and the subsequent comparison with respect to the first image IM1 (S308 to S314). In short, if a predetermined time has passed after a switching to the mouse mode is made, the second image IM2 is erased unconditionally. If a predetermined time has passed after a switching to the mouse mode is made, there is a high possibility that a certain operation is carried out and that the content of the first image is changed. Therefore, it is reasonable to delete the second image.

The number of modes for the processing of the operation content of the indicator and the definition of each mode are not limited to the above examples. To sum up, the user does not carry out an explicit erasure operation, and it is determined whether the erasure of an image displayed on top of another is to be executed or not, triggered by a switching by the user of the setting for the processing of the operation content of the indicator (that is, information designating which processing the operation content should be reflected on). In short, according to the invention, the probability of the user carrying out an operation to erase the second image IM2 is estimated reasonably on the basis of a mode switching (and the duration of the mode as well), and whether to automatically erase the second image IM2 or not is determined on the basis of the result of the estimate.

In the case where a plurality of computers as an image supply source is connected to one projector, as a condition for carrying out automatic erasure of an image displayed on top of another, the detection by the image supply source of a switching made by the user may be used, instead of the detection of a mode switching via the indicator or in addition to this detection. If the check of a mode switching and the check based on the duration of the preset mode are combined, the order of executing each check and the way to combing these checks are not limited to the above operation examples.

The format of connection between the display mechanism of the display device and the PC to which the control method of the invention is applied, is not limited to the above examples. For instance, the projector may have the function of generating the first image IM1. In other words, the functions of the PC 200 and the functions of the projector 300 may be realized by a single piece of hardware, so as to realize the display system of the invention. In this case, instead of omitting the projection function, the display unit 260 of the PC 200 may be provided with the function of detecting the indicator 400, and the user may designate a position on the screen of the PC using the indicator 400, thus drawing an annotation on the screen of the PC 200.

In other words, a display system according to the invention may include: an image supply unit; an input unit which has image data inputted from the image supply unit; a detection unit which detects a position of an indicator and generates indicator information including information about the detected position; a setting unit which sets a mode for processing of the indicator information to a first mode or a second mode; a drawing unit which draws a second image generated on the basis of the indicator information and superimpose the second image on a first image generated on the basis of the inputted image data; a selection unit which outputs the indicator information to the drawing unit if the first mode is set and which outputs the indicator information to the image supply unit if the second mode is set; and a drawing control unit which erases the second image if a switching from the first mode to the second mode is carried out. The drawing unit may be provided in the device which supplies the first image, or may be provided in a separate device from the computer.

What is claimed is:

1. A display device comprising:
   an input unit to which image data is inputted from an image supply device;
   a detection unit which detects a position of an indicator and generates indicator information including information about the detected position;
   a setting unit which sets a mode for processing of the indicator information to a first mode or a second mode;
   a drawing unit which draws a second image generated on the basis of the indicator information and superimposes the second image on a first image generated on the basis of the inputted image data;
   a selection unit which
      outputs the indicator information to the drawing unit and not to the image supply device if the first mode is set, and
      outputs the indicator information to the image supply device if the second mode is set; and
   a drawing control unit which erases the second image if a switching from the first mode to the second mode is carried out.

2. The display device according to claim 1, wherein the drawing control unit executes the erasure of the second image if it is detected that the first image is updated, after the switching is carried out.

3. The display device according to claim 1, wherein the drawing control unit executes the erasure of the second image if a predetermined period passes without having the first image updated, after the switching is carried out.

4. The display device according to claim 1, further comprising a storage unit which stores the second image, wherein the drawing control unit stores the second image in the storage unit before executing the erasure of the second image.

5. A display control method comprising:
   inputting image data from an image supply device;
   detecting a position of an indicator and generating indicator information including information about the detected position;
   setting a mode for processing of the indicator information to a first mode or a second mode;
   causing a drawing unit to draw a second image generated on the basis of the indicator information and superimpose the second image on a first image generated on the basis of the inputted image data;
   outputting the indicator information to the drawing unit and not to the image supply device if the first mode is set;
   outputting the indicator information to the image supply device if the second mode is set; and
   erasing the second image if a switching from the first mode to the second mode is carried out.

6. The display control method according to claim 5, wherein
   the erasing of the second image is executed if it is detected that the first image is updated, after the switching is carried out.

7. The display control method according to claim 5, wherein
   the erasing of the second image is executed if a predetermined period passes without having the first image updated, after the switching is carried out.

8. The display control method according to claim 5, further comprising storing the second image in a storage unit before executing the erasure of the second image.

9. A display system comprising:
   an image supply unit;
   an input unit to which image data is inputted from the image supply unit;
   a detection unit which detects a position of an indicator and generates indicator information including information about the detected position;
   a setting unit which sets a mode for processing of the indicator information to a first mode or a second mode;
   a drawing unit which draws a second image generated on the basis of the indicator information and superimposes the second image on a first image generated on the basis of the inputted image data;
   a selection unit which
      outputs the indicator information to the drawing unit and not to the image supply unit if the first mode is set, and
      outputs the indicator information to the image supply unit if the second mode is set; and
   a drawing control unit which erases the second image if a switching from the first mode to the second mode is carried out.

10. The display system according to claim 9, wherein the drawing control unit executes the erasure of the second image if it is detected that the first image is updated, after the switching is carried out.

11. The display system according to claim 9, wherein the drawing control unit executes the erasure of the second image if a predetermined period passes without having the first image updated, after the switching is carried out.

12. The display system according to claim 9, further comprising a storage unit which stores the second image,
wherein the drawing control unit stores the second image in the storage unit before executing the erasure of the second image.

13. A display device comprising:
an input unit to which image data is inputted from an image supply device;
a detection unit which detects a position of an indicator and generates indicator information including information about the detected position;
a setting unit which sets a mode for processing of the indicator information to a first mode or a second mode;
a drawing unit which draws an image generated on the basis of the indicator information;
a selection unit which
outputs the indicator information to the drawing unit and not to the image supply device if the first mode is, set and
outputs the indicator information to the image supply device if the second mode is set; and
a drawing control unit which erases the image if a switching from the first mode to the second mode is carried out.

14. The display device according to claim 13, wherein the drawing control unit executes, after the switching is carried out, the erasure of the image if it is detected that there has been an update to an additional image generated on the basis of the inputted image data.

15. The display device according to claim 13, wherein the drawing control unit executes, after the switching is carried out, the erasure of the image if a predetermined period passes without having an update to an additional image generated on the basis of the inputted image data.

16. The display device according to claim 13, further comprising a storage unit which stores the image,
wherein the drawing control unit stores the image in the storage unit before executing the erasure of the image.

* * * * *